Patented Nov. 10, 1953

2,658,913

UNITED STATES PATENT OFFICE 2,658,913

PROCESS FOR THE PRODUCTION OF NAPHTHALENE AND RELATED DERIVATIVES, AND DERIVATIVES HIGHLY CHLORINATED, PARTIALLY HYDROGENATED TRIPHENYLENE

Julius Hyman and Milton Silverman, Denver, Colo., assignors, by mesne assignments, to Shell Development Company, Emeryville, Calif., a corporation of Delaware No Drawing. Application April 18, 1951, Serial No. 221,736

16 Claims. (Cl. 260—543)

This invention relates to new compounds useful in the preparation of naphthalene derivatives and to a process for the production of naphthalene derivatives. More specifically, this invention relates to new compounds which essentially are derivatives of a highly chlorinated, partially hydrogenated triphenylene, and to a process for the production of derivatives of naphthalene therefrom in which the substituents are preferentially in beta positions and in which all substituents or substituting groups are confined to a single ring of the naphthalene nucleus.

It has long been known to organic chemists that, in general, multi-substituted derivatives of naphthalene in which the substituents are confined to only one ring of the naphthalene nucleus generally could be obtained only with considerable difficulty and then only by means of procedures which require a multiplicity of operating steps. It has also been known that, in general, mono-substituted derivatives in which the substituent is in the beta position and di-substituted derivatives in which the substituents are in the 2 and 3 positions can be prepared only with great difficulty and in poor yield. There are, of course, exceptions to the foregoing general statements. Thus, by operating at relatively high temperature the sulfonation of naphthalene can be directed to give a mono-beta-sulfonic acid and by operating in appropriate solvents the Friedel-Crafts reaction will, in some cases, yield a beta-substituted derivative. In general, however, substitution in the naphthalene nucleus tends to occur primarily at an alpha position. Also, since the reagents, which are ordinarily used for direct substitution in aromatic compounds, introduce groups which tend to inactivate a benzenoid ring system, further substitution in naphthalene, after the first, occurs in the remaining unsubstituted ring: as a result, the poly-substituted derivatives obtained have substituents in both of the rings of the naphthalene nucleus. No simple processes have hitherto been available which would restrict poly-substitution to a single ring of the naphthalene system, and similarly no processes have hitherto been available which would allow direct preparation of beta derivatives when employing such common reagents as the halogens and nitric acid. Consequently, while such compounds as alpha-bromo-naphthalene and alpha-nitro-naphthalene are commonplace, the corresponding beta- derivatives are unavailable in commercial quantities and currently possess no economic importance since they can be obtained only via relatively complicated routes and almost necessarily, therefore, in poor yields.

Among the objects of the present invention are to provide a novel process for the production of naphthalene derivatives; to provide such a process for the production of a naphthalene derivative having a single substituent in the beta position; to provide such a process for the production of a naphthalene derivative having two substituents, in the 2,3 positions; to provide such a process for the production of a poly-substituted naphthalene derivative in which all substituents are confined to a single ring; and to provide such processes which may be carried out comparatively economically and with comparatively high yields. It is a more specific object of the present invention to prepare these naphthalene derivatives in which the substituents are preferably in the beta position and in which all substituents or substituting groups are confined to a single ring of the naphthalene nucleus by forming a halogenated or nitro substituted derivative of a highly chlorinated, partially hydrogenated triphenylene, using a common substitution reagent, chlorine, bromine or nitric acid, then thermally decomposing this.

Among further objects of this invention are to provide a new process for the production of novel derivatives of highly chlorinated, partially hydrogenated triphenylene in which bromine, chlorine, nitro, or sulfonyl chloride is substituted in the benzenoid ring; and to provide such compounds which possess singular utility for the preparation of naphthalene derivatives of the above types.

Additional objects and the novel features of this invention will become apparent from the description which follows.

Before describing the novel processes and compounds of this invention, for a better understanding thereof, it is desirable to refer to a certain polychlorinated, partially hydrogenated triphenylene compound particularly useful in carrying out the process of this invention and in the production of the novel compounds thereof.

Thus, the co-pending application of Julius Hyman and A. A. Danish, Serial No. 45,575, filed August 21, 1948, discloses and claims a novel Diels-Alder adduct which is obtained when hexachlorocyclopentadiene is caused to react with naphthalene; in that reaction, naphthalene reacts as a dienophile and adds two molar equivalents of hexachlorocyclopentadiene. The reaction involved may be represented by the following equation:

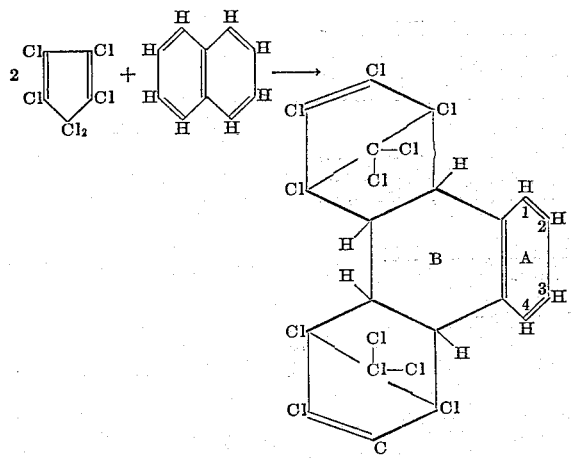

As will be evident, the product of the foregoing equation, $C_{20}H_8Cl_{12}$, is a polychlorinated, partially hydrogenated triphenylene, which for ease of reference is designated as CHTP, but may also be considered as containing highly chlorinated, polyhydro, di-endomethanophenanthrene fused to a benzene ring, since it is also evident from its structural formula that one ring, designated therein by means of the letter A, retains an intact benzenoid structure. It is further evident from its structural formula that a second ring, designated therein by means of the letter B, has attached thereto four hydrogen atoms which would be expected to be readily available for substitution.

It has also been found that the reaction which produced the compound CHTP is reversible, and at temperatures above about 150° C., it reverts to its generators, i. e. hexachlorocyclopentadiene and naphthalene. The actual reaction conditions which may be employed to prepare the compound CHTP are fully disclosed and discussed in the copending application above cited. However, in order to make reference to that document unnecessary, illustrative Example I which is given later shows how the compound CHTP has been prepared.

In accordance with the present invention, the above compound CHTP is utilized in making the new compounds of this invention, and also in the novel process of making naphthalene derivatives which contain a single substituent in the 2 position, two substituents in the 2,3 positions, and all substituents, up to a maximum of four, confined to a single ring. For this purpose, substitutions may be made in the benzenoid ring A, as by chlorination, bromination, nitration, etc. As has been found, the halogenated polyhydro phenanthrene fused to the benzene ring appears to reduce the reactivity of that ring, and the ring A thus was not found to undergo the substitution reactions of a simple benzene ring. Nevertheless, it was also found that certain reaction conditions, equivalent to those necessary for substitution of a relatively highly deactivated benzene ring, could be utilized to cause substitution, as through chlorination, bromination, nitration, etc., in the ring A without affecting the ring B. The compounds produced by these benzene substitution reactions, when applied to CHTP, were completely new, since, except for the disclosure previously referred to in the hereinbefore cited patent application, there is no record of the previous existence of a compound containing a benzene ring fused to a highly chlorinated, polyhydro, di-endomethanophenanthrene.

Also, these compounds were quite different from the products which might be anticipated on the basis of the prior art. In general, compounds containing a benzene ring fused to an alicyclic ring system react with the reagents ordinarily used to introduce substituents into the benzene ring in such fashion as to bring about a change in the alicyclic ring rather than in the benzene ring. This can be illustrated by the reactions of tetralin with bromine. (The unsaturated and primarily saturated rings of tetralin can be considered to correspond to the rings A and B of the compound CHTP.) When tetralin is treated with bromine, the alicyclic ring is brominated and by the subsequent loss of the elements of hydrogen bromide can ultimately be aromatized. In marked contrast, the di-endomethanophenanthrene nucleus in the compound CHTP was completely inert and all reaction occurred in the benzenoid cyclo A. Thus, the chlorination of the compound CHTP led finally to a tetrachloro derivative in which the chlorines were attached to the carbon atoms numbered 1, 2, 3, and 4 in the structure CHTP given above. Similarly, bromination gave a dibromo compound in which the two bromine atoms were attached to the carbon atoms numbered 2 and 3, while nitration gave a mono-nitro derivative in which the nitro group was attached to the carbon atom numbered 2.

Unexpectedly, also, it has been found that these new derivatives of CHTP possess highly important utility for the preparation of unusual but valuable substituted naphthalenes. Thus, in further accordance with this invention, the above derivative of CHTP may merely be heated to produce a desired substituted naphthalene. Investigations have shown that the formation of derivatives of CHTP, of the type already referred to, does not appreciably affect the ease with which hexachlorocyclopentadiene can be split from the compounds thus formed. Heating the new derivatives of CHTP to about the same temperatures required to cause CHTP itself to revert to its generators caused these derivatives to form hexachlorocyclopentadiene and corresponding derivatives of naphthalene. As a result, it follows that substituted naphthalenes, in which all of the substituents are contained in one ring, and also substituted naphthalenes in which the substituents are in the beta position only, can now readily be prepared. Thus, for example, when the nitro CHTP hereinbefore alluded to was heated, beta-nitronaphthalene was obtained in high yield.

The conversion of derivatives of CHTP to a substituted naphthalene and hexachlorocyclopentadiene was readily accomplished by heating the CHTP derivative to a temperature within the range of 150° C.– 300° C. This conversion process step was not critical as to operative conditions since several variations have worked satisfactorily. It was carried out with the CHTP derivative dissolved or suspended in a relatively inert solvent and it has been carried out without the use of a solvent by effecting destructive distillation of the CHTP derivative in order to obtain the desired substituted naphthalene and regenerate hexachlorocyclopentadiene in relatively pure form. At the lower temperatures indicated, it may be necessary to prolong the heating period so that the compound is at the indicated temperature for as long as 24 hours; at the higher temperature indicated, the conversion has been completed in an hour or less. Even higher temperatures have been employed when conditions were so regulated as to shorten the time for which the organic substances were subjected to high temperatures. In the illustrative examples which follow later, conditions which have been employed for the decomposition of CHTP derivatives into hexachlorocyclopentadiene and substituted naphthalenes will be concretely set forth. It must, of course, be remembered that these examples are illustrative only; once the general procedures required for this decomposition are disclosed, those skilled in the art will readily see how many modifications can be introduced, and all of these modifications thus necessarily fall within the scope of the present invention.

It is evident that the novel and unexpected discoveries hereinabove disclosed provide a basic and wholly new process for the preparation of naphthalene derivatives, of a type hitherto difficult to prepare and available only uneconomically. In order to prepare such naphthalene derivatives, it is now only required that naphthalene be reacted with hexachlorocyclopentadiene in order to form CHTP; that the CHTP thus prepared be transformed, by a substitution reaction to an appropriate derivative, and that the CHTP derivative thus obtained be thermally decomposed at relatively low temperatures in order to produce the desired naphthalene derivative and recover the relatively pure hexachlorocyclopentadiene. Since all of these individual steps of this process proceeded readily and in good yield, and since the recovery of hexachlorocyclopentadiene was nearly quantitative, it is apparent that naphthalene derivatives made by this process can, in comparison with procedures which previously were required, be obtained relatively inexpensively.

As will indeed be obvious to those skilled in the art of the synthesis of aromatic compounds, the procedures which may be employed are numerous and varied; these various procedures do not, in themselves, constitute critical factors for the invention here disclosed. While the fact that the compound CHTP formed benzenoid derivatives under conditions sometimes employed for benzene or benzenoid substitutions, and while the compounds thus obtained are new and possess unexpected properties, the conditions which can be employed for producing these derivatives correspond to those well known to the art. Thus, once one skilled in the art is made aware of the fact that these derivatives have been prepared in the fashion already indicated, and is further informed that the benzenoid nucleus in the compound CHTP was found, in effect, to be a relatively non-reactive nucleus and should therefore be treated under substantially severe reaction conditions in order to obtain desired derivatives, the information which is required in order to prepare such derivatives of CHTP is completely made known to him. Many of the examples which follow will illustrate procedures which have been employed for the preparation of derivatives of the compound CHTP. It must, however, be emphasized that these examples are illustrative only and that a variety of other procedures, normally employed for preparing derivatives of aromatic compounds, can likewise be employed to prepared derivatives of the compound CHTP. All such procedures are properly within the scope of the invention here disclosed.

EXAMPLE I

A. *Preparation of CHTP*

Into a three liter flask were placed 378.0 g. of naphthalene and 1622.0 g. of hexachlorocyclopentadiene having a 94.2% purity (mole ratio 1:2). The resulting solution was heated at 157° C. for 120 hours; at the end of that time, the reaction mixture was chilled, whereupon a large quantity of crystalline material separated from the solution. These crystals were separated on a filter, washed with acetone and dried. There were thus obtained 361 g. of a substance concluded to be CHTP, melting at 211.5–213.5° C. Analysis (by infra-red spectroscopy) indicated that the solution remaining after separation of the precipitated crystals still contained 164 grams of CHTP.

B. *Preparation of Tetrachloro-CHTP*

A mixture containing 150 grams of CHTP, 225 ml. of tetrachloroethane and 0.5 gram of iron powder was heated to 95° C., at which temperature all of the CHTP dissolved in the solvent. Chlorine was passed through the mixture for a 5 hour period, while it was maintained at a temperature of 90–105° C. Near the end of chlorination, a considerable amount of solid separated from the mixture. The reaction mixture was then cooled and filtered; the crude product thus obtained was dissolved in hot toluene and treated with a decolorizing charcoal; and the clarified solution was diluted with about one-half its volume of methanol. A solid product crystallized from the resulting solution: it was separated, washed with methanol and dried, and was found to melt at 226–227° C. Elemental analysis showed the solid to be tetrachloro-CHTP. The yield of this material (150 grams) was in excess of 84% of the quantity theoretically obtainable.

C. *Preparation of 1,2,3,4-tetrachloronaphthalene from tetrachloro-CHTP*

Ten grams of tetrachloro-CHTP was heated, in vacuo, to a temperature above 220° C. A mixture of hexachlorocyclopentadiene and a solid product was thus obtained. This solid was isolated on a filter, and twice recrystallized from methanol, which gave a solid which crystallized in the form of needles and melted between 190–193° C. Elementary analysis, its crystal habit and its melting point confirmed that the solid thus prepared was 1,2,3,4-tetrachloronaphthalene.

EXAMPLE II

*Preparation of 2,3-dibromo CHTP*

One hundred grams of CHTP, 200 ml. of tetrachloroethane and 0.5 gram iron powder (reduced by hydrogen) were placed in a flask fitted with a reflux condenser and a dropping funnel. The mixture was heated to reflux (by which time the CHTP had dissolved in the tetrachloroethane) and 30 ml. of bromine (twice theory, to compensate for bromine lost by HBr entrainment and by bromination of the solvent or its impurities) dissolved in 30 ml. of tetrachloroethane, was added dropwise over a period of an hour. Refluxing was continued for an additional two hours. The bromine and FeBr₃ which formed were removed by shaking the warm solution with aqueous sodium bisulfite and subsequently washing it with water. The solution was then dried and treated with a decolorizing charcoal. The warm solution, obtained after filtration, was then diluted with about 400 ml. of methanol. A crystalline solid separated which melted between 220–222° C., and the yield was approximately 100 grams. It was concluded to be dibromo CHTP after analysis including the following:

Calculated for $C_{20}H_6Cl_{12}Br_2$: C, 28.8; H, 0.72
Found: C, 28.5; H, 0.75

*Preparation of 2,3-dibromonaphthalene from dibromo CHTP*

Dibromo CHTP (220 grams) was introduced into a 200 ml. flask by melting it as it was introduced. When all the material was molten, the flask was mounted with a Claisen head, a condenser and a receiver and the distillation system was carefully evacuated to an absolute pressure of 70–100 mm. Hg. The flask contents were heated and at a pot temperature of 220° C., hexachlorocyclopentadiene distilled over. Distillation was continued until the production of hexachlorocyclopentadiene became very slow and small amounts of solid appeared in the material distilling over. The dark residue left in the flask, while still hot and fluid, was poured into benzene and heated with decolorizing charcoal. The solution remaining after the removal of the charcoal was diluted with methanol: a crude brown crystalline solid was deposited by this solution. This crude solid was recrystallized from heptane; there was thus obtained a light brown product which crystallized in flakes and melted between 137–139° C. By treatment with cuprous cyanide in pyridine solution this solid was converted to the known 2,3-dicyanonaphthalene. This fact, together with its melting point and its elementary analysis, unambiguously identified the solid obtained as 2,3-dibromonaphthalene.

EXAMPLE III

*Nitration of CHTP, mode 1*

Into a three liter flask fitted with an efficient stirrer, was placed 1120 grams of concentrated sulfuric acid, 880 grams of concentrated nitric acid and 400 grams of CHTP (mole ratio, $H_2SO_4:HNO_3:CHTP=17.5:16.5:1$)

The suspension was vigorously stirred and maintained, for a period of approximately 5 hours, at a temperature of approximately 100° C. During the course of this time, the suspension of essentially white solid originally present gave way to a suspension of a light yellow solid. At the end of five hours, the mixture was cooled, and brought on a filter. The light yellow solid crystalline material thus separated was washed with water and dried; it melted between 203–207° C. A mixture of this solid with an equal weight of the starting material CHTP melted below 200° C., while the solid analyzed as follows:

Calculated for $C_{20}H_7Cl_{12}NO_2$: Cl, 59.2; N, 2.0
Found: Cl, 59.0, 59.5; N, 2.0

The solid was thus concluded to be a mononitro CHTP. Repeated recrystallization from hexane of the solid melting between 203–207° C., caused its melting point to rise to 222–223° C.

As the nitration above described proceeded, the course of the reaction was followed by infra-red spectroscopic analysis, and the following results were obtained:

| Hours at 100° C. | Percent CHTP | Percent Mono NO₂-CHTP |
|---|---|---|
| 1.0 | 42.4 | 55.8 |
| 1.5 | 24.3 | 66.9 |
| 2.0 | 17.2 | 73.8 |
| 2.5 | 12.0 | 84.3 |
| 3.0 | 7.6 | 88.0 |
| 3.5 | 5.3 | 82.6 |
| 4.0 | 4.4 | 87.5 |
| 4.5 | 3.8 | 92.0 |

*Nitration of CHTP, mode 2*

The procedure employed, except for the mole ratios used and the duration of the nitration reaction, was identical with that of mode 1 of this Example III. The reactants were used in the molar ratio of $H_2SO_4:HNO_3:CHTP=33.8:23.5:1.0$, while the nitration was continued for 8 hours. A yield (based on CHTP used) of 95% of theoretical was obtained.

*Preparation of beta-nitronaphthalene from mono-nitro CHTP (mode 1)*

Three hundred grams of the mono-nitro CHTP of mode 1 was placed in a flask fitted for downward distillation and subjected to slow distillation in vacuo at a pot temperature of 245–290° C. The distilled material, taken overhead, weighed 274.0 grams (91.4% of the charge). Analysis of the distillate by infra-red spectroscopy gave the following results:

|  | Theory | Found |
|---|---|---|
| Percent beta-nitronaphthalene | 24.1 | 24.7 |
| Percent hexachlorocyclopentadiene | 73.9 | 73.5 |

This distillate was carefully fractionated in vacuo (1.0 mm. Hg abs.) to separate the hexachlorocyclopentadiene from the naphthalene derivative; the $C_5Cl_6$ was collected at 79–84° C. The residue in the distilling flask crystallized on cooling, and was taken up in ethanol and treated with decolorizing charcoal. After separation of the charcoal on a filter, the ethanol solution was diluted with water and slowly cooled, and yellow crystals of nitro-naphthalene separated. One additional recrystallization from aqueous ethanol gave a product melting at 78–79° C. An authentic sample of beta-nitronaphthalene, obtained by classical but complicated methods, also melted at 78–79° C. An equal weight mixture of these two materials also melted at 78–79° C. The product obtained by the method just described gave the following analysis:

Calculated for nitronaphthalene, $C_{10}H_7NO$: C, 69.4; H, 4.2.
Found: C, 69.2; H, 4.1.

The product obtained by the foregoing method was also reduced to the corresponding amine and the acetyl and benzoyl derivatives of the amine were prepared. The amine thus obtained, and its two derivatives, were compared with an authentic sample of beta-naphthylamine and its corresponding derivatives and found to be identical. The product was thus unambiguously identified as beta-nitronaphthalene.

*Preparation of beta-nitronaphthalene from mono-nitro CHTP (mode 2)*

A solution containing 200 grams of mono-nitro

CHTP dissolved in 500 grams of xylene was pumped, at the rate of 48 ml. per minute, through a ½" I. D. nickel tube heated over an eight inch length to a temperature of 329.5–371° C. The effluent vapors from the cracking tube were condensed and stripped of the solvent xylene. Analysis by infra-red spectroscopy of the liquid residue remaining after the xylene had been removed indicated that it contained 23.0% of beta-nitronaphthalene (theory, 24.1%). The beta-nitronaphthalene was isolated by the method described in Example VIII.

EXAMPLE IV

*Preparation of CHTP sulfonyl chloride (Friedel-Crafts reaction)*

A mixture of 27.0 grams (0.04 mole) of CHTP, 75 cc. of $SO_2Cl_2$ and 6.2 grams (0.046 mole) of $AlCl_3$ were refluxed for 4 hours. The reaction mixture turned a dark purple and HCl gas was evolved. The reaction mixture was then poured into 200–300 cc. of ice water; the mixture was extracted with ethyl acetate; and the ethyl acetate was washed with water, separated and dried over anhydrous sodium sulfate. After removal of the drying agent on a filter, the ethyl acetate solvent was stripped from the product by distillation, and the heavy oil which remained was dissolved in 100 ml. of warm hexane. When the hexane solution thus obtained was cooled, a solid separated. The solid was isolated on a filter and washed with hexane; the crude solid melted between 243–253° C. Recrystallization of this crude solid from nitromethane raised its melting point to 252–254° C., and it was concluded to be the expected CHTP sulfonyl chloride after the following analysis:

Calculated for $C_{20}H_7Cl_{13}O_2S$: Cl, 59.7; S, 4.1.
Found: Cl, 60.0; S, 4.6.

As has already been indicated, there are many variations which can be employed to produce CHTP derivatives other than the procedures hereinbefore specifically set forth. Thus, the nitro derivative of Example III, mode 1, can be reduced either chemically, using such reagents as zinc and sulfuric acid in the presence of acetic acid, to produce an amine; or, under suitably modified conditions, to produce the acetyl derivative of an amine; or it can be reduced catalytically to produce the amine itself. Similarly, it can be partially reduced to produce azo-derivatives, hydrazo-derivatives and hydroxyl amine derivatives.

As will be evident, the process herein disclosed can be employed to produce a variety of naphthalene derivatives. Thus, for example, the compound CHTP can be methylated to produce a methyl derivative. This methyl derivative can be oxidized to the corresponding carboxylic acid and the carboxylic acid thus obtained can be gently pyrolyzed to produce beta-naphthoic acid. While beta-naphthoic acid is known, it cannot be obtained readily by the methods hitherto employed. However, application of the process just outlined can make beta-naphthoic acid easily and relatively cheaply available.

It should be emphasized that the process herein outlined is a fundamentally new process for the preparation of naphthalene derivatives of a type previously extremely difficult to prepare and generally commercially unavailable. This fundamentally new process comprehends many modifications of the steps which may be employed for producing the necessary intermediates through which it proceeds; accordingly, all such modifications of the individual process steps are properly included within its scope. This invention, therefore, is not to be limited by the examples or the illustrative material hereinbefore set forth but only by the following claims.

What is claimed is:

1. A process for the production of a naphthalene derivative which comprises reacting the adduct of naphthalene and hexachlorocyclopentadiene, in which two molecules of hexachlorocyclopentadiene are fused with a single ring of naphthalene, with a reagent which introduces a substituent from the group consisting of nitro, bromine and chlorine into a benzenoid ring, and then heating said substituted adduct to a minimum temperature of 150° C. to produce hexachlorocyclopentadiene and a substituted naphthalene in which all substitutents up to a maximum of four are confined to the single ring and there is a substituent in the beta position.

2. A process for the production of hexachlorocyclopentadiene and a substituted naphthalene in which all substituents are confined to a single ring and there is a substituent in the beta position, as defined in claim 1, wherein said substituted adduct is heated to a temperature of substantially 150–300° C.

3. A process of the production of hexachlorocyclopentadiene and a substituted naphthalene in which all substituents are confined to a single ring and there is a substituent in the beta position, as defined in claim 1, wherein said substituted adduct is heated at not above atmospheric pressure.

4. A process for the production of beta-nitronaphthalene and hexachlorocyclopentadiene which comprises reacting the adduct of naphthalene and hexachlorocyclopentadiene, in which two molecules of hexachlorocyclopentadiene are fused with a single ring of naphthalene, with nitric acid to introduce a $NO_2$ group into the unreacted benzenoid ring, and then heating said mono-nitro adduct to a minimum temperature of 150° C. to produce hexachlorocyclopentadiene and beta-nitronaphthalene.

5. A process for the production of 2,3-dibromonaphthalene and helachlorocyclopentadiene which comprises reacting the adduct of naphthalene and hexachlorocyclopentadiene, in which two molecules of hexachlorocyclopentadiene are fused with a single ring of naphthalene, with bromine to introduce bromine atoms into the unreacted benzenoid ring, and then heating said di-bromo adduct to a minimum temperature of 150° C. to produce hexachlorocyclopentadiene and 2,3-dibromonaphthalene.

6. A process for the production of a highly chlorinated, partially hydrogenated triphenylene derivative, which comprises the step of reacting the adduct of naphthalene and hexachlorocyclopentadiene, in which two molecules of hexachlorocyclopentadiene are fused with a single ring of naphthalene, with a reagent which introduces a substituent into the beta position of the unreacted benzenoid ring, said substituent being from the group consisting of Cl, Br, $NO_2$ and $SO_2Cl$.

7. A process for the production of a highly chlorinated, partially hydrogenated triphenylene derivative, which comprises the step of reacting the adduct of naphthalene and hexachlorocyclopentadiene, in which two molecules of hexachlorocyclopentadiene are fused with a single ring of naphthalene, with nitric acid which introduces a NO₂ group into the beta position of the unreacted benzenoid ring.

8. A process for the production of a highly chlorinated, partially hydrogenated triphenylene derivative, which comprises the step of reacting the adduct of naphthalene and hexachlorocyclopentadiene, in which two molecules of hexachlorocyclopentadiene are fused with a single ring of naphthalene, with bromine which introduces two bromine atoms into the 2,3-positions of the unreacted benzenoid ring.

9. A process for the production of a highly chlorinated, partially hydrogenated triphenylene derivative, which comprises the step of reacting the adduct of naphthalene and hexachlorocyclopentadiene, in which two molecules of hexachlorocyclopentadiene are fused with a single ring of naphthalene, with chlorine which introduces four chlorine atoms into the 1,2,3,4-positions of the unreacted benzenoid ring.

10. A process for the production of a highly chlorinated, partially hydrogenated triphenylene derivative, which comprises the step of reacting the adduct of naphthalene and hexachlorocyclopentadiene, in which two molecules of hexachlorocyclopentadiene are fused with a single ring of naphthalene, with sulfuryl chloride which introduces a SO₂Cl group into the beta position of the unreacted benzenoid ring.

11. The substituted derivative of the adduct of one mole of naphthalene and two moles of hexachlorocyclopentadiene in which the substituent is from the group consisting of nitro, sulfonyl chloride, bromine and chlorine, the nitro and sulfonyl chloride each being in the 2 position, the bromine being in the 2,3 positions and the chlorine being in the 1,2,3,4 positions.

12. A process for the production of 1,2,3,4-tetrachloronaphthalene and hexachlorocyclopentadiene which comprises reacting the adduct of naphthalene and hexachlorocyclopentadiene, in which two moles of hexachlorocyclopentadiene are fused with a single ring of naphthalene, with chlorine to introduce chlorine atoms into the unreacted benzenoid ring, and then heating said tetra-dichloro adduct to a minimum temperature of 150° C. to produce hexachlorocyclopentadiene and 1,2,3,4-tetrachloronaphthalene.

13. The mono-nitro substituted derivative of the adduct of one mole of naphthalene and two moles of hexachlorocyclopentadiene in which the NO₂ group is in the 2 position.

14. The substituted 2,3-di-bromo derivative of the adduct of one mole of naphthalene and two moles of hexachlorocyclopentadiene.

15. The substituted 1,2,3,4-tetra-chloro derivative of the adduct of one mole of naphthalene and two moles of hexachlorocyclopentadiene.

16. The mono-sulfonyl chloride substituted derivative of the adduct of one mole of naphthalene and two moles of hexachlorocyclopentadiene in which SO₂Cl group is in the 2 position.

JULIUS HYMAN.
MILTON SILVERMAN.

References Cited in the file of this patent

FOREIGN PATENTS

| Number | Country | Date |
|---|---|---|
| 234,912 | Germany | May 26, 1911 |

OTHER REFERENCES

Huntress, "Organic Chlorine Compounds," pages 216–7 (1948).